United States Patent
Austin et al.

(10) Patent No.: US 8,943,030 B2
(45) Date of Patent: Jan. 27, 2015

(54) DIGITAL FILE MANAGEMENT SYSTEM

(75) Inventors: Jarrod Austin, Englewood, CO (US); Matthew J. Coburn, Denver, CO (US); Sathyan Krishna, Denver, CO (US); Daniel L. Rudolph, Castle Rock, CO (US); Karen Taxier, Lakewood, CO (US); Mark Templeman, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 552 days.

(21) Appl. No.: 12/604,284

(22) Filed: Oct. 22, 2009

(65) Prior Publication Data

US 2010/0043023 A1 Feb. 18, 2010

Related U.S. Application Data

(63) Continuation of application No. 11/618,399, filed on Dec. 29, 2006, now Pat. No. 7,885,936.

(51) Int. Cl.
| | |
|---|---|
| *G06F 17/30* | (2006.01) |
| *G11B 27/034* | (2006.01) |
| *H04N 5/76* | (2006.01) |
| *H04N 5/781* | (2006.01) |
| *H04N 9/804* | (2006.01) |

(52) U.S. Cl.
CPC ........ *G06F 17/30067* (2013.01); *G11B 27/034* (2013.01); *H04N 5/76* (2013.01); *H04N 5/781* (2013.01); *H04N 9/8042* (2013.01)
USPC ........................................................ 707/694

(58) Field of Classification Search
USPC ........................................................ 707/694
See application file for complete search history.

(56) References Cited

U.S. PATENT DOCUMENTS

| | | |
|---|---|---|
| 6,233,389 B1 | 5/2001 | Barton et al. |
| 6,642,939 B1 | 11/2003 | Vallone et al. |
| 7,885,936 B2 | 2/2011 | Austin et al. |
| 2002/0040475 A1* | 4/2002 | Yap et al. ......................... 725/39 |
| 2002/0092021 A1 | 7/2002 | Yap et al. |
| 2003/0014753 A1 | 1/2003 | Beach et al. |
| 2003/0110513 A1 | 6/2003 | Plourde, Jr. et al. |
| 2003/0237093 A1 | 12/2003 | Marsh |
| 2004/0003404 A1* | 1/2004 | Boston et al. .................... 725/55 |
| 2005/0108769 A1 | 5/2005 | Arnold et al. |
| 2005/0132418 A1 | 6/2005 | Barton et al. |
| 2006/0161635 A1 | 7/2006 | Lamkin et al. |
| 2007/0214473 A1* | 9/2007 | Barton et al. ................... 725/28 |
| 2008/0031590 A1 | 2/2008 | Kulas |

(Continued)

OTHER PUBLICATIONS

U.S. Appl. No. 11/618,399, filed Dec. 29, 2006.

(Continued)

*Primary Examiner* — Ajay Bhatia
*Assistant Examiner* — Kurt Mueller
(74) *Attorney, Agent, or Firm* — Ingrassia Fisher & Lorenz, P.C.

(57) ABSTRACT

A method for managing digital content is provided. The method includes accessing the digital content and applying at least one content management rule by a set-top box to the digital content. The content management rule operative to place the digital content in one of a first storage location and a second storage location, which are associated with the set-top box. The digital content may include programs or movies and the storage locations are generally operable to store multiple programs and/or movies.

18 Claims, 14 Drawing Sheets

(56) References Cited

U.S. PATENT DOCUMENTS

2008/0147650 A1    6/2008  Marsh
2008/0152315 A1*   6/2008  Peters et al. ............... 386/124
2010/0247067 A1*   9/2010  Gratton ...................... 386/83

OTHER PUBLICATIONS

Ex parte Quayle Action dated Oct. 20, 2009, U.S. Appl. No. 11/618,399, 7 pages.

Amendment and Response to Final Office Action dated Oct. 8, 2009, U.S. Appl. No. 11/618,399, 5 pages.

Advisory Action dated Aug. 25, 2009, U.S. Appl. No. 11/618,399, 3 pages.

Amendment and Response to Final Office Action dated Aug. 6, 2009, U.S. Appl. No. 11/618,399, 5 pages.

Final Office Action dated Jul. 8, 2009, U.S. Appl. No. 11/618,399, 15 pages.

Amendment and Response to Office Action dated Mar. 30, 2009, U.S. Appl. No. 11/618,399, 13 pages.

Office Action dated Dec. 29, 2008, U.S. Appl. No. 11/618,399, 16 pages.

* cited by examiner

DIGITAL FILE MANAGEMENT SYSTEM

CROSS-REFERENCE TO RELATED APPLICATIONS

This application is a continuation of prior U.S. patent application Ser. No. 11/618,399, filed Dec. 29, 2006, the entire contents of which are hereby incorporated by reference.

FIELD OF THE INVENTION

The invention relates generally to digital broadcasting systems and methods, and more specifically to a digital file management system.

BACKGROUND OF THE INVENTION

As information technology continues to advance and become more widespread, the ability to efficiently manage content and data (collectively, "content") associated with the technology is increasingly important. Some examples of ways content is currently delivered to users are through the use of satellite, cable, the Internet, Ethernet, local area networks, wide area networks, wireless communication (including Bluetooth, infrared, radio frequency and ultra-high frequency transmissions), and other data transmission mechanisms, schemes and configurations (collectively referred to herein as "networks"). Content may be received on a device such as a set-top box (STB), personal video recorder (PVR), personal computer (PC), mobile phone, handheld computing device, personal digital assistant, television, audiovisual receiver, stereo system, radio and so forth. Content can include audiovisual data such as an entertainment program, a content display program, a utility program, a product support program, a game, entertainment data, advertisement data, music data, pictures or a movie. Content can also include non-audiovisual data such as data files and so forth.

For illustrative purposes only, personal video recorders (PVRs) will be primarily discussed herein, although it should be understood the following discussion may be applied equally to other devices capable of receiving and/or storing content. PVRs or digital video recorders are devices that are capable of storing programming on a magnetic storage device such as a hard disk and playing back the programming on a display device, such as a television. Many PVRs can store at least thirty hours of programming, thus allowing a large number of television shows, movies and the like to be recorded. PVRs may list recorded content in chronological order. Therefore, a PVR that can store fifty hours of programming could have up to one hundred half-hour shows listed in chronological order, making it difficult for the user to find their desired content.

Accordingly, there is a need in the art for an improved method and system for managing digital content.

BRIEF SUMMARY OF THE INVENTION

One embodiment of the present invention takes the form of a method and system for managing digital content through the use of a personal video recorder. The system and method provides for the placement of content, deletion of content, editing of content, and sorting of content.

In one embodiment, a method for managing digital content is provided. The method comprises accessing the digital content and applying at least one content management rule to the digital content. The content management rule operative to place the digital content in one of a first storage location and a second storage location.

In one embodiment, a method for managing content is provided. The method comprises accessing a remote digital content, automatically generating a folder in response to accessing the remote digital content, and automatically placing the recorded digital content in the generated folder.

In one embodiment, a method of associating a digital content with a folder is provided. The method comprises selecting a digital content, selecting a folder with which to associate the digital content, determining if the digital content is in a present folder and further determining if the digital content is part of a multi-event timer. If the digital content is not part of a multi-event timer, moving the digital content to the selected folder and if the digital content is part of a multi-event timer, determining if the entire multi-event timer is to be associated with the selected folder. If the entire multi-event timer is to be associated with the selected folder, moving the digital content and any additional digital content associated with the multi-event timer to the selected folder. If only the single selected digital content is to be associated with the selected folder, moving the digital content to the selected folder. If the digital content is not in a present folder, placing the digital content in the selected folder and if the digital content is in a present folder, moving the digital content to the selected folder if the selected folder is different from the present folder.

In one embodiment, a method of associating a timer with a folder is provided. The method comprises selecting a timer, wherein the timer has is associated with at least one of present and future content, selecting a folder with which to associate the timer, and determining if the timer is associated with a present folder. If the timer is not associated with a present folder, associating the timer with the selected folder, and if the timer is associated with a present folder, determining if the selected folder is to be associated with the present and future content of the timer. If the selected folder is to be associated with the present and future content of the timer, the present content is moved to the selected folder from the present folder. If only the future content of the timer is to be associated with the selected folder, the present content of the timer remains in the present folder.

While multiple embodiments are disclosed, still other embodiments will become apparent to those skilled in the art from the following detailed description, which shows and describes illustrative embodiments of the invention. Such other embodiments are considered within the spirit and scope of the present invention. As will be realized, the design is capable of modifications in various aspects, all without departing from the spirit and scope of the invention. Accordingly, the drawings and detailed description are to be regarded as illustrative in nature and not restrictive.

DETAILED DESCRIPTION OF THE INVENTION

Figure 1:
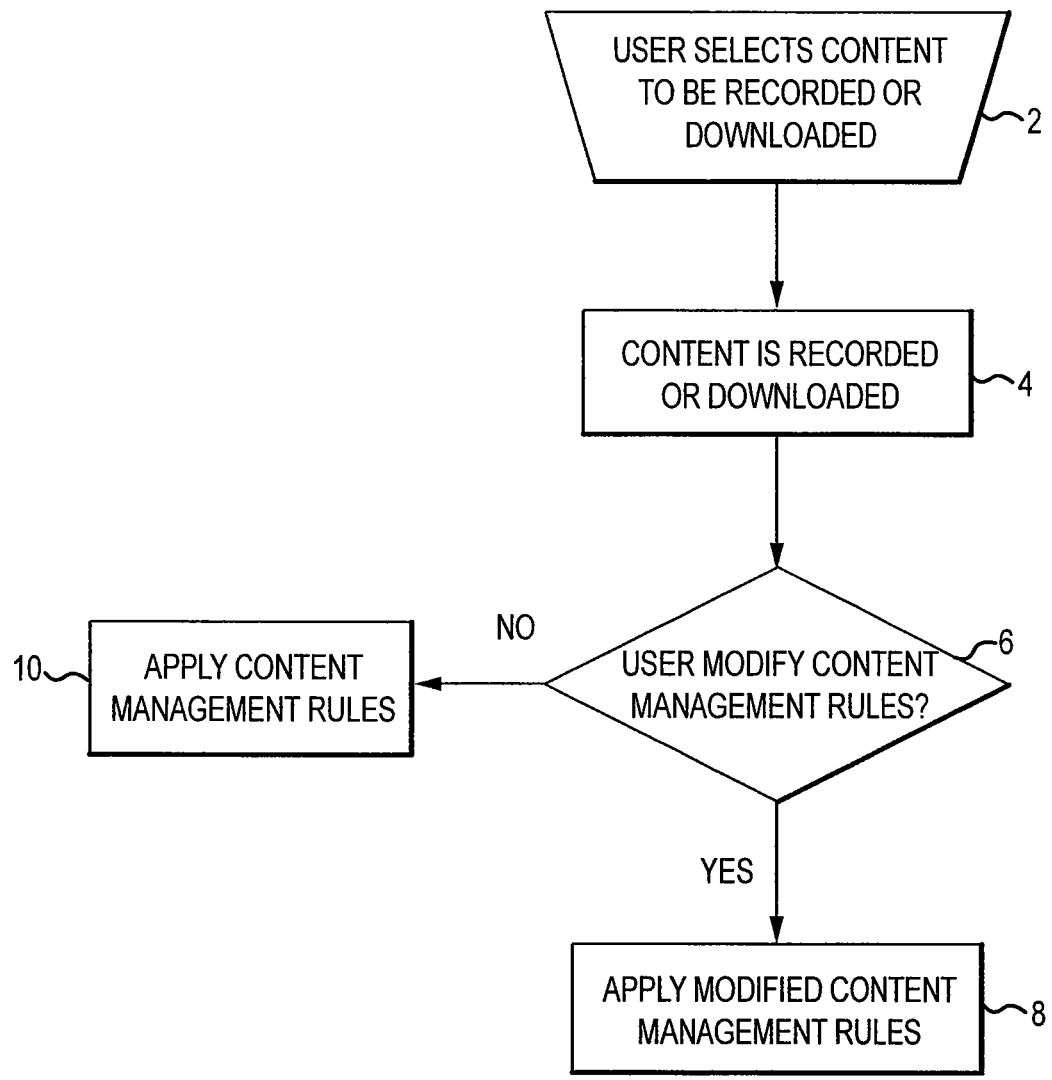
FIG. 1 is a flowchart of an exemplary content management method of the present invention.

Generally, one embodiment of the present invention takes the form of a method and system for managing digital content through the use of a personal video recorder (PVR). The use of other devices for managing digital content, such as personal computers, mobile devices, phones, and personal digital assistants, are within the spirit and scope of the invention. Using the example of a PVR, a PVR includes any device capable of receiving a digital video stream and storing the stream in a digital, rather than analog, format. Examples of PVRs include the TIVO® system, manufactured by TiVo Inc. of Alviso, Calif.; the Replay TV system, manufactured by Replay TV, Inc. of Mountain View, Calif.; and the Ultimate TV system, manufactured by Microsoft Corp. of Redmond, Wash. PVRs typically include one or more internal storage devices, often in the form of hard drives, used to digitally record/download content. The recorded/downloaded content can be any format such as MPEG, MP3, and digital data, and can be across any network such as the Internet, wired networks, and wireless networks. The recorded/downloaded content may then be replayed at a later date.

The present invention allows for the automatic and manual creation of folders as well as the automatic and manual placement of recorded and downloaded content into the folders. This may reduce the organizational problem associated with long lists, such as chronological listings of recorded data.

In one embodiment, a user, using the PVR, selects content that the user desires to be recorded or downloaded. The PVR then records or downloads the selected content. If the recorded/downloaded selected content has a content management rule associated with it, the rule is applied. Content management rules typically include rules that control the placement, editing, renaming, deletion, sorting and presentation of content. For example, if a user has selected the PVR to record an episode of Seinfeld, and another episode of Seinfeld has already been recorded and stored on the PVR, the PVR may execute a rule that automatically places both recorded episodes of Seinfeld in a Seinfeld folder. If a Seinfeld folder already exists, the PVR may place the recently recorded episode of Seinfeld in the Seinfeld folder which may already contain the existing Seinfeld episode.

In another embodiment, a user may associate a particular recording/download, timer or feature with a new or an existing folder. An example of a feature is a search function that engages the PVR to review metadata to record or store content having metadata matching a user-selected keyword (hereinafter referred to as a "searcher"). In this context, a timer is any mechanism that allows a user to program the PVR to record particular content or at a particular time on a particular channel. The timer can be for a single event, a particular keyword, or a recurring event (for example, the timer can be set to record channel 8 from 7 PM to 8 PM every Thursday).

In a further embodiment, a user may create, edit, delete, or rename folders. The user may also move recordings/downloads or timers from a folder (if they are in a folder already, or from a list if they are not in a folder) to the newly created, edited or renamed folder.

In yet another embodiment, the user may sort recordings/downloads based on a particular theme or genre, on particular timers, on actors/actresses, on directors, on a series name or other metadata. Information such as theme, genre, actors/actresses, director, name, title, rating and so on, is received by the PVR in the form of metadata and presented to the user via an electronic program guide (EPG). In the following description, EPG includes any display provided by the PVR to the user and includes displays that are shown when a user presses a "menu" or "guide" button on the PVR or a remote for the PVR. The EPG may be a graphical user interface in order to display relevant information to the user, such as recording/download names, metadata associated with a recording/download, folder structures and so on.

Exemplary Content Management Method

Referring to FIG. 1, an exemplary content management method that may be executed by, or in conjunction with, an exemplary embodiment is shown. In operation 2, a user of a PVR selects content to be recorded or downloaded. The user may select the content directly, for example by clicking or indicating the desired content or by setting a timer to record/download specific content. The user may alternatively indirectly select the content, for example by setting up one or more keywords and using a searcher or similar type of feature that searches metadata associated with content to determine if the metadata matches a keyword, as well as recording/downloading such matching content. In operation 4, once the content has been selected, the content is recorded/downloaded by the embodiment (and particularly typically by the PVR). For example, in the case of recorded content, the content may be placed under a menu item, such as a My Recordings menu item (shown in FIG. 2), which may be accessed through the EPG of the PVR. Downloaded content may be placed in the My Recordings menu item 11, or may be placed under a separate menu item for downloaded content only. It should be understood that menu item 11 is a list of data recorded/downloaded by the user, and not a folder as the term "folder" is used herein. By contrast, a folder typically contains content selected by the user (or by the embodiment) through application of one or more content management rules. In other words, the "My Recordings" menu item 11 lists all recorded content by default, while a folder contains a subset of recorded/downloaded content matching a particular content management rule.

In operation 6, once the content has been recorded/downloaded, the system may check to see if the user has modified or wants to modify any content management rules. The user may modify content management rules at any time, and in many instances the system operates automatically without user modification. Content management rules include, but are not limited to: placement of the content under the My Recordings menu item 11 or under a separate menu item (such as a folder for downloaded content); creating, editing, renaming, or deleting a folder within a menu item; associating types of content (including recordings, downloads, searchers, and timers) with one or more new or existing folders or one another; moving content from one folder to another folder; sorting folders within a menu item or content within a particular folder; or any other content management function that involves the placement, presentation, sorting or editing of content.

Operation 8 is accessed if the embodiment determines in operation 6 that the user has modified at least one content management rule. In operation 8, if the user has already modified the content management rules or chooses to do so, the system applies the modified content management rules (presuming any apply to the selected content). The system may continue to use the modified content management rules as they apply to the selected type of content unless modified again by the user.

By contrast, operation 10 is accessed if the embodiment determined in operation 6 that no content management rules were modified. In operation 10, if the user does not wish to make any modifications (for example, the user does nothing), then the system applies the already existing content management rules for the particular content selected by the user (again, presuming any apply to the content selected in operation 2). Whether the existing content management rules or modified content management rules are used, the user may select the content he wants recorded/downloaded if the selected content is not covered by one of the existing rules (for example, the content is not going to be recorded by a recurring timer or by the use of a searcher that would select the content because metadata associated with the content matches a keyword).

It should be noted that, in alternative embodiments, operation 4 may occur after operations 6-10 occur. In such embodiments, the content management rules may be pre-applied to selected content or applied simultaneously or during download or recording of the content.

Electronic Program Guide

Figure 2:
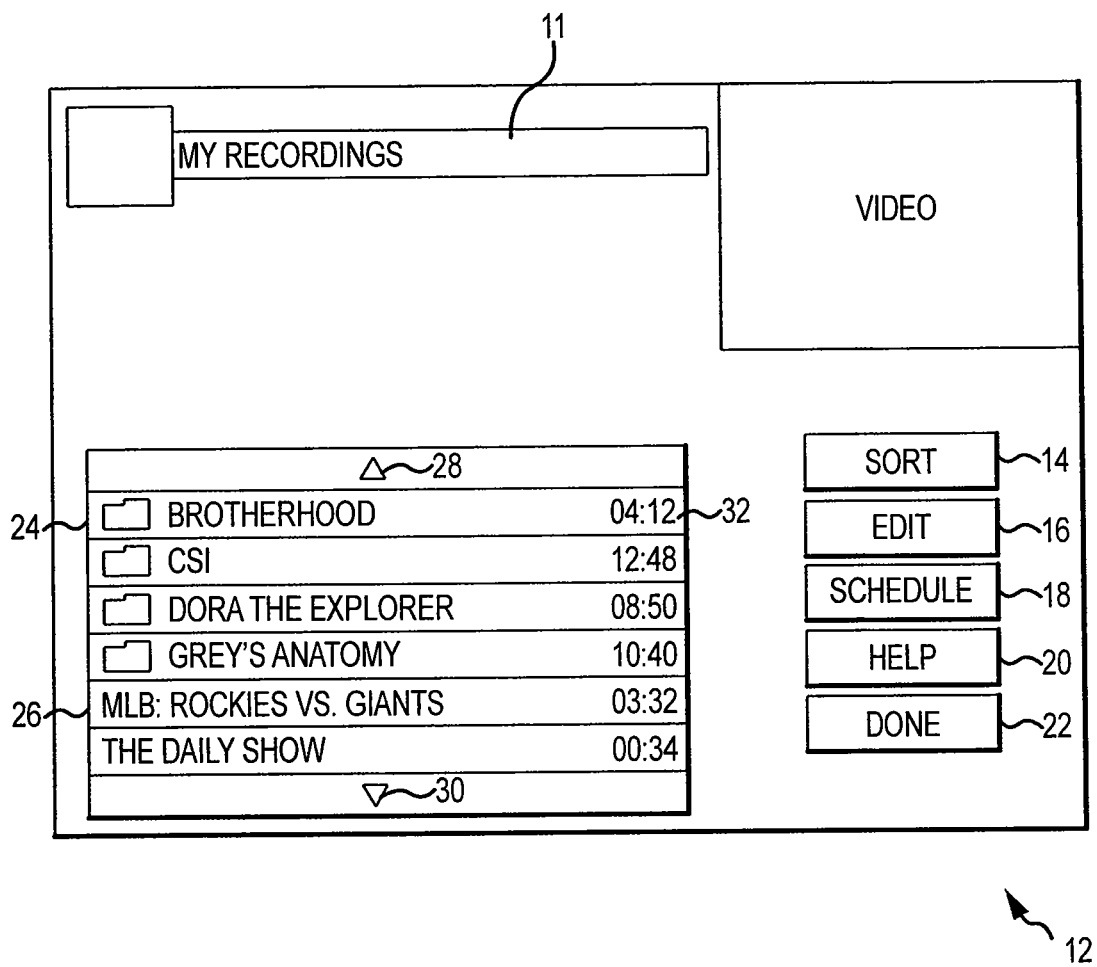
FIG. 2 is one embodiment of an electronic program guide of the present invention.
Figure 3:
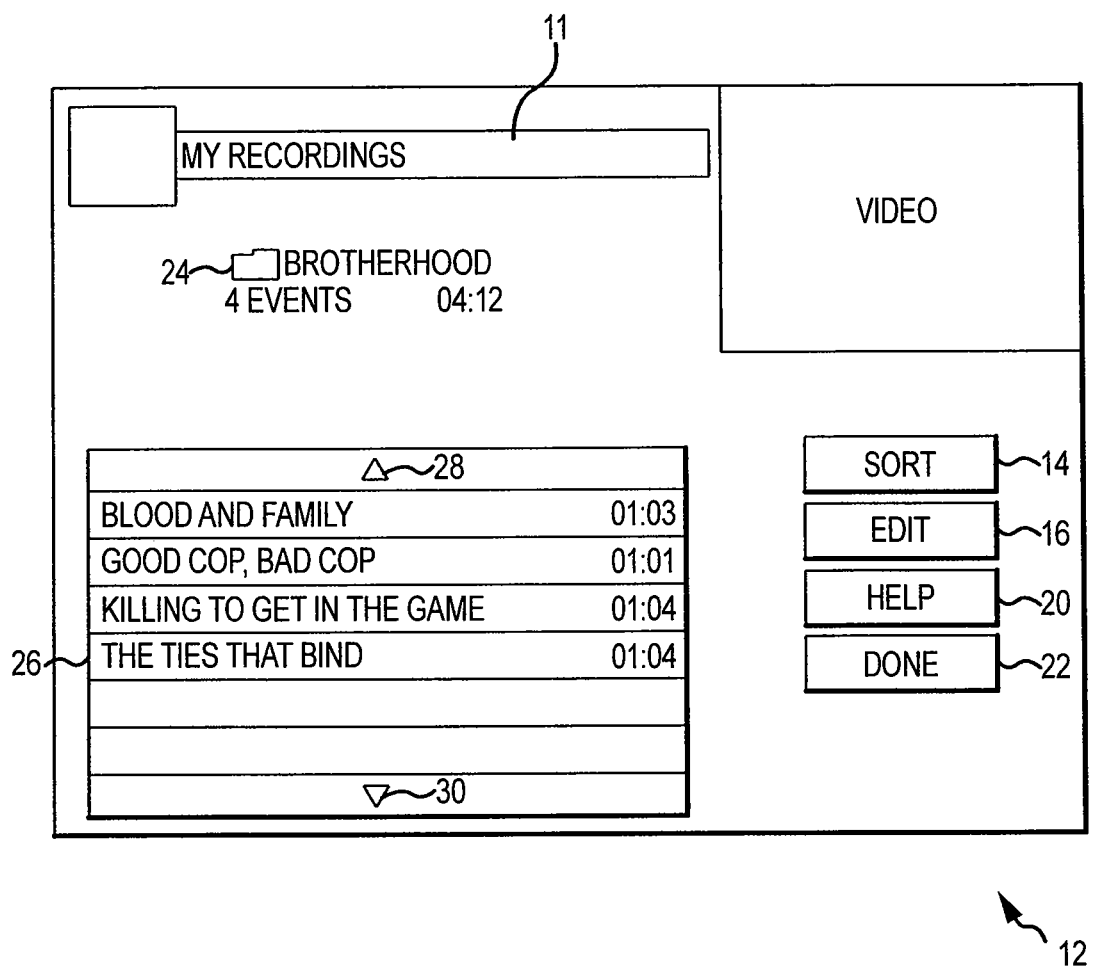
FIG. 3 is a display accessed from FIG. 2.
Figure 4:
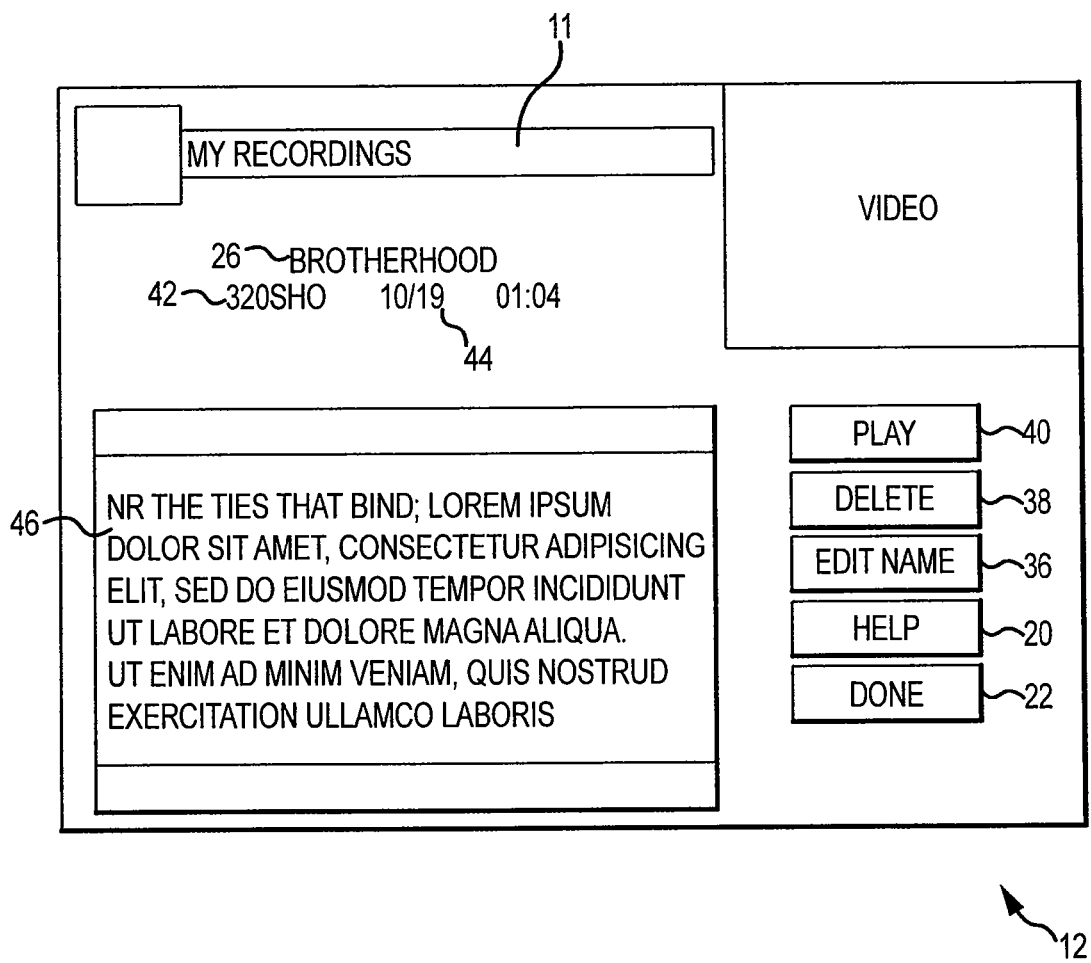
FIG. 4 is a display accessed from FIG. 3 displaying a recording description.
Figure 5:
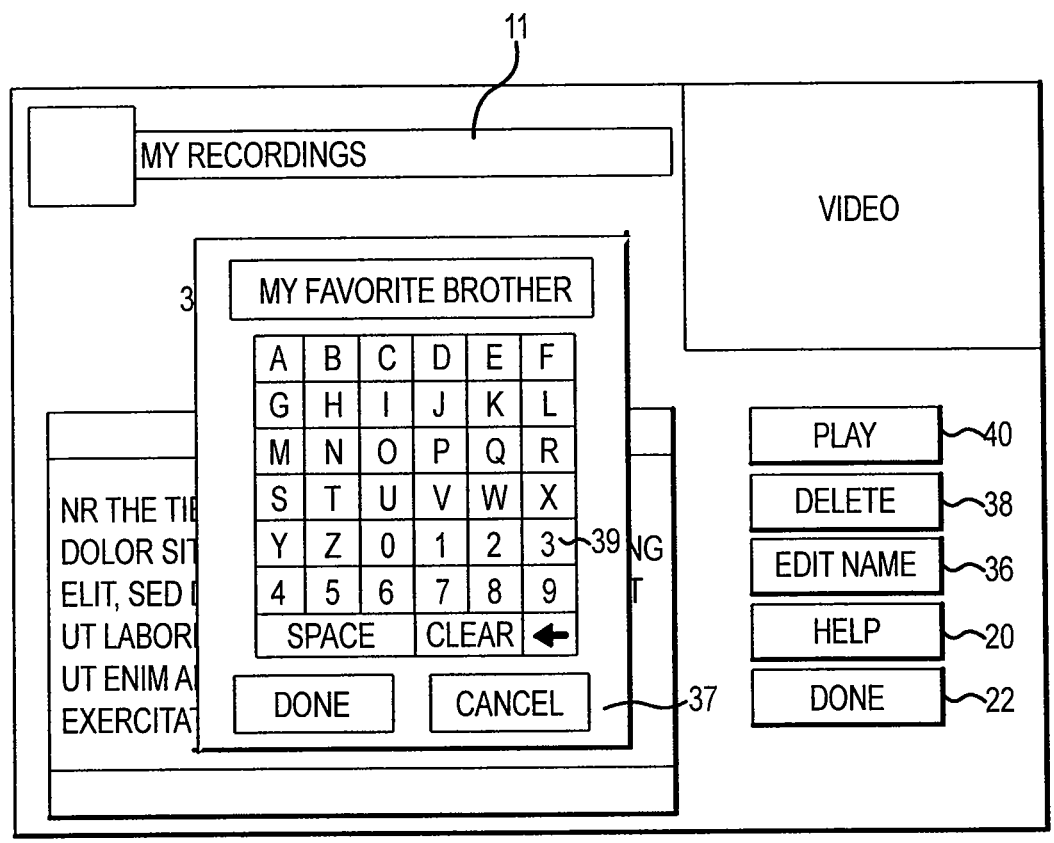
FIG. 5 is a display accessed from FIG. 4 displaying an edit name feature.
Figure 6:
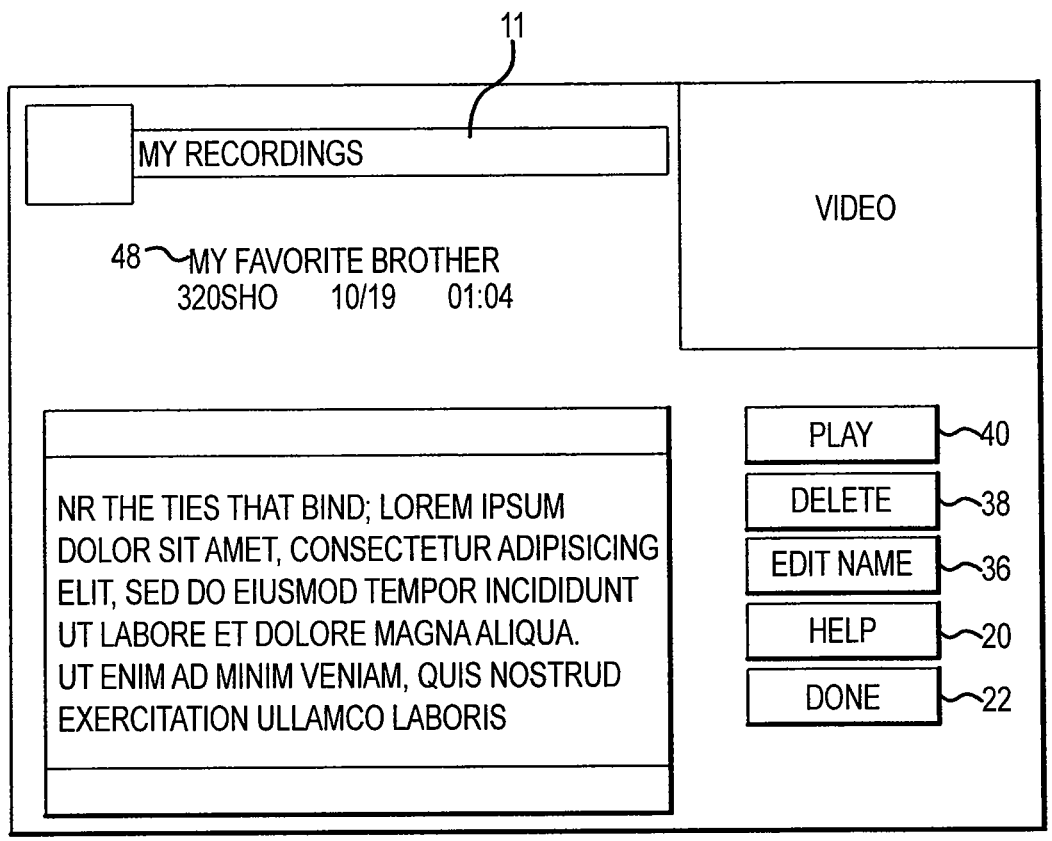
FIG. 6 is a display accessed from FIG. 5 displaying an edited recording name.
Figure 7:
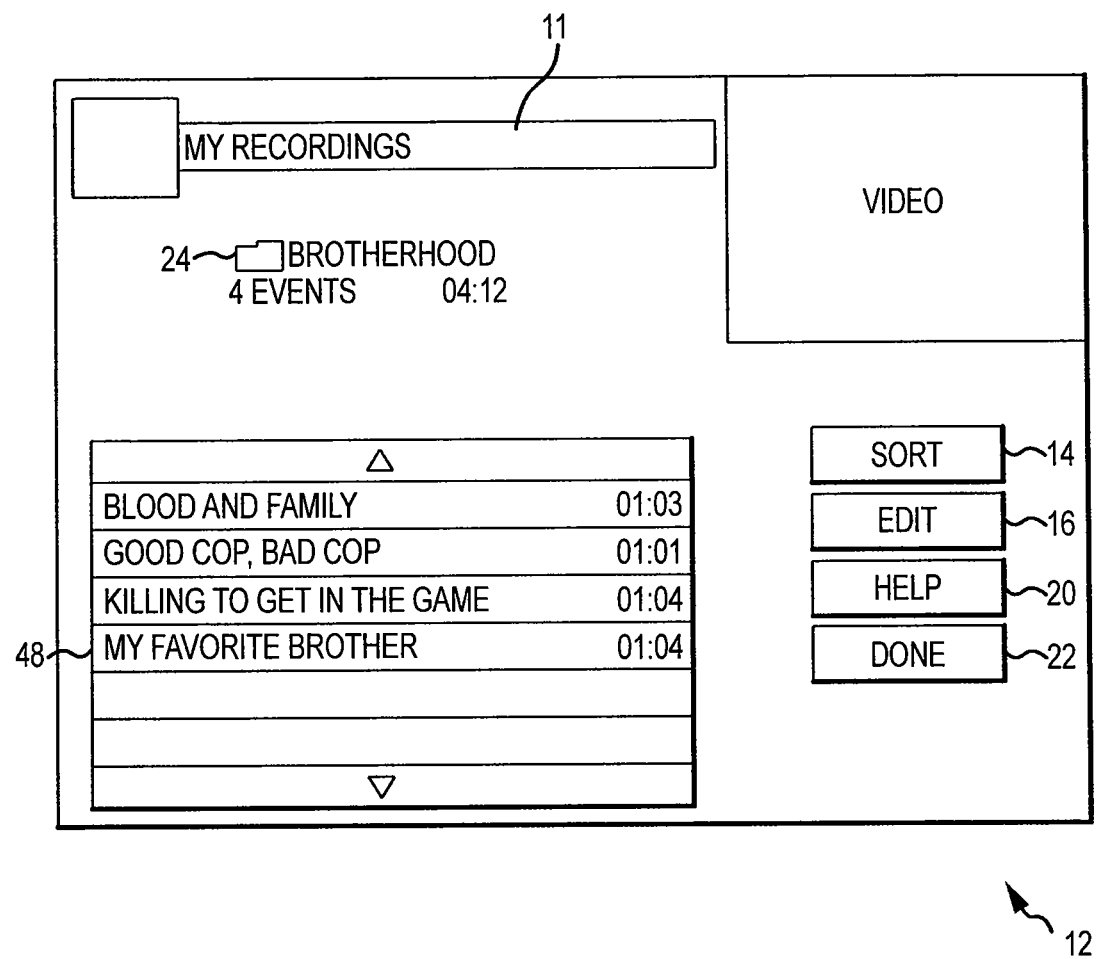
FIG. 7 is a display accessed from FIG. 6 displaying an edited recording name in a folder.
Figure 8:
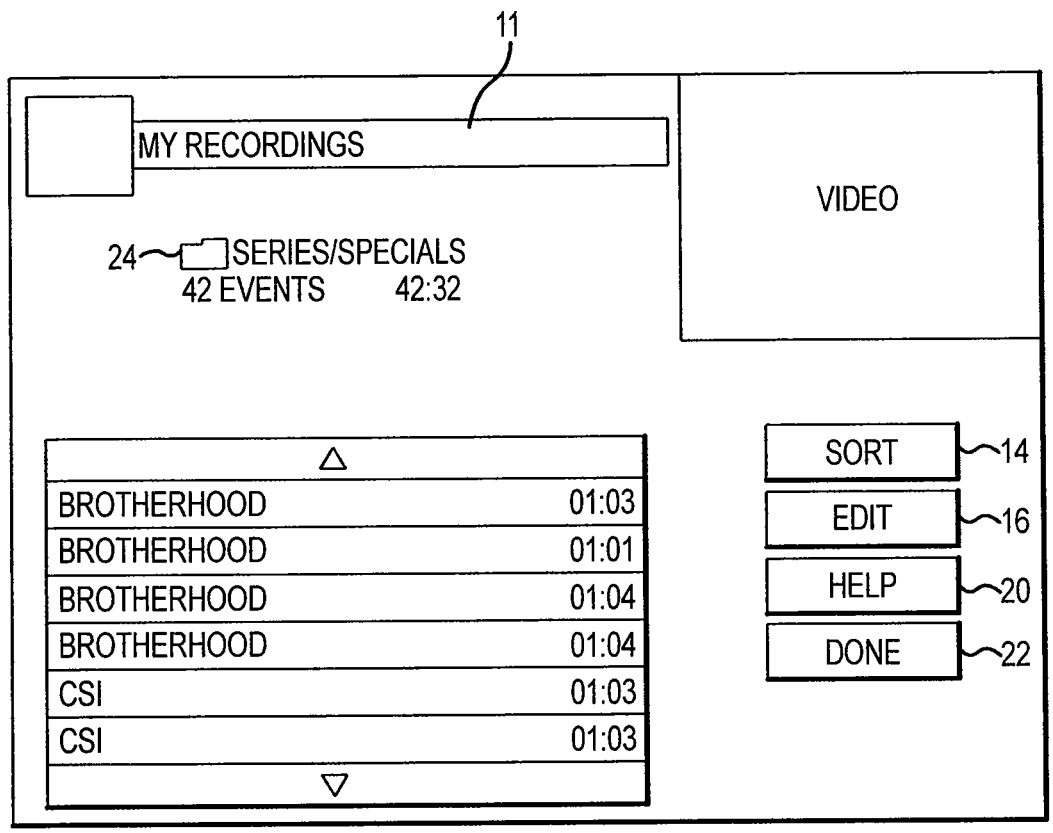
FIG. 8 is one embodiment of an electronic program guide displaying a folder comprising a collection of television series.

For a discussion of an electronic program guide utilized by a PVR of the present invention, reference is now made to FIGS. 2-8. FIG. 2 is one embodiment of an electronic program guide 12 of the present invention. FIG. 3 is a display accessed from FIG. 3 displaying a recording description. FIG. 4 is a display accessed from FIG. 3 displaying a recording description 46. FIG. 5 is a display accessed from FIG. 4 displaying an edit name feature 36. FIG. 6 is a display accessed from FIG. 5 displaying an edited recording name 48. FIG. 7 is a display accessed from FIG. 6 displaying an edited recording name 48 in a folder. FIG. 8 is one embodiment of the electronic program guide 12 displaying a folder comprising a collection of television series.

In FIGS. 2-8, a My Recordings menu item 11 has been selected and the contents of menu item 11 are displayed on the interface of the electronic program guide 12. Electronic program guide 12 displays recorded/downloaded content in the form of singular list items 26 and folders 24 that may contain content. In FIG. 2, various folders, such as "Brotherhood," "CSI," "Dora the Explorer," and "Grey's Anatomy" folders, are shown. Also in FIG. 2, singular list items 26 such as "MLB: Rockies vs. Giants" and "The Daily Show" are shown. In this embodiment, the folders 24 are shown at the top of the list ("first") and the singular list items 26 follow the folders 24. Also, in this embodiment, both the folders 24 and the singular list items 26 are alphabetized by the first letter in the title. In other embodiments, the singular list items 26 may be listed before the folders 24. In yet further embodiments, the singular list items 26 and the folders 24 may be mixed together. The singular list items 26 and the folders may be organized chronologically, by ascending or descending recording lengths, by director/actor, alphabetically (as shown in FIG. 2) or by any suitable organizational method.

Both the folders 24 and the singular list items 26 typically have a time 32 associated with them as shown in FIG. 2. For singular list items 26, the time 32 represents the length of time of the recording/download for that singular list item 26. For folders 24, the time 32 represents the aggregated playback times for all singular list items 26 (if any) contained within the folder 24.

The EPG 12 may provide to a user a scroll up button 28 that, when pressed, scrolls the list up one spot to show a previously unseen folder 24 or singular list item 26, while hiding the current uppermost folder 24 or singular list item 26. For example, in FIG. 2 this would be the Brotherhood folder. The EPG 12 also provides a user a scroll down button 30 that, when pressed, scrolls the list down one spot to show a previously unseen folder 24 or singular list item 26, while hiding the current bottommost folder 24 or singular list item 26. For example, in FIG. 2 this would be The Daily Show singular list item. The scroll up button 28 and scroll down button 30 allow the EPG 12 to potentially display a large number of folders 24 and singular list items 26 without taking up a large amount of space on the interface.

In the present embodiment, the EPG 12 includes a Sort button 14. The Sort button 14 allows a user to sort the folders 24 and the singular list items 26 alphabetically, chronologically (e.g., when the content was recorded/downloaded), by ascending or descending recording lengths, by Artists, by type of folder 24, or by any suitable organizational method. A user may select the organizational method desired for sorting both folders 24 and singular list items 26 after selecting the Sort button 14, or from the Sort button 14.

In one embodiment, the EPG 12 includes an Edit button 16. The Edit button 16 allows a user to edit folders 24 and/or the singular list items 26. By highlighting a folder 24 or a singular list item 26 and selecting the Edit button 16, the user may be presented the options of deleting or renaming the highlighted folder 24 or singular list item 26. Further, by selecting the Edit button 16 without highlighting a folder 24 or singular list item 26, the user may be presented the option of creating a new folder 24.

In the present embodiment, the EPG 12 may include a Schedule button 18. The Schedule button 18 allows a user to view, modify, and create timers. In one embodiment, by highlighting/selecting a folder 24 and selecting the Schedule button 18, a user may associate a particular timer with the particular highlighted folder 24. Therefore, all recordings made as a result of the timer may be placed automatically into the highlighted folder 24.

Further, the EPG 12 may include a Help button 20. The Help button 20 provides the user information on how to use the different features of the PVR including how to navigate the EPG 12. The Help button 20 may include a searchable help menu (not shown) where the user may search on his particular problem. In another embodiment, the Help button 20 has a frequently asked questions list with helpful problem solving tips.

When the user no longer wishes to view the contents of the My Recordings menu item 11, the user may select a Done button 22 which returns the user to a main/root menu list (not shown) that displays the various menu list items available to the user.

Referring to FIG. 3, the Brotherhood folder 24 of FIG. 2 has been selected and the contents displayed to the user. In this example, the Brotherhood folder 24 includes "Blood and Family," "Good Cop, Bad Cop," "Killing to get in the Game," and "The Ties That Bind," all of which are Brotherhood episodes shown as singular list items 26. The times 32 for each singular list item 26 are shown and the total cumulative time 32 (in this case, 4:12) is shown for folder 24.

By selecting one of the singular list items 26 from folder 24 the user may access additional information regarding the singular list item 26. For example, in FIG. 4 the user has selected the "The Ties That Bind" singular list item 26. One type of additional information available to the user is a recording/download description 46. The recording/download description may be an abstract summary of the recording, including (but not limited to) the actors'/actresses' names, type of movie/show/series (for example, comedy, horror, drama etc.), and a brief synopsis of the plot. It should be noted that such descriptions generally are examples of metadata. In the case of recordings, as soon as the recording starts, the recording content is available to be accessed by the user. For downloads, the downloaded content is available to be accessed by the user once the entire download has been completed. In one embodiment, downloads are immediately accessible like recordings.

Singular list items 26 may be thought of as links or pointers (collectively, "pointers") to the actual content or multiple content. That is, the list item 26 points to the location of the stored content on the PVR. A single list item 26 may point to multiple content. For example, the pointer may be directed to a two-hour recording stored on the PVR containing two one-hour shows. Each one-hour show may be a separate example of content and thus the list item 26 may point to multiple content back-to-back. Folders 24 may include a dedicated pointer (the only pointer to that particular content), a shared pointer (a pointer that is also found in another folder or location), both a shared pointer and dedicated pointer, or neither a shared pointer or dedicated pointer. In the case of shared pointers, only a single copy of the content may be maintained on the PVR's storage in order to preserve storage space on the PVR. In one embodiment, when a shared pointer is modified, the modification is shown in all the folders in which the shared pointer is stored. In another embodiment, when a shared pointer is modified (such as being deleted or edited, in whole or in part), the modification is only shown in the folder in which it is modified. Modifications include renaming the shared pointer and deleting the shared pointer.

Referring now to FIG. 4 and the exemplary embodiment, once a singular list item 26 has been selected, a source identifier 42 may be provided to the user. The source identifier 42 displays either the channel number, the channel name or both. A date identifier 44 is also available to the user. The date identifier 44 displays the date that the recording/download was recorded/downloaded. The embodiment may also present a Play button 40 to the user. The Play button 40, when selected, plays the recorded/downloaded content. A Delete button 38 may also be presented to the user. When the Delete button 38 is selected, the singular list item 26 is deleted. In one embodiment, if multiple pointers to a content exist, selecting the Delete button 38 removes the singular list item 26 only from the folder 24 from which it was selected for deletion (that is, only the pointer in a particular folder is deleted, but a copy of the content may remain on the PVR/storage). In another embodiment, when the Delete button 38 is selected the singular list item 26 is globally deleted (that is, all singular list items 26 matching the deleted singular list item 26 selected by the user are removed, as well as the content pointed to by the deleted singular list item 26).

The embodiment may also display an Edit Name button 36 to the user. The Edit Name button 36 allows a user to change the name of the singular list item 26. An example of this is shown in FIG. 5. The Edit Name button 36, when selected, instructs the embodiment to present an Edit Screen 37 that optionally contains an alphanumeric keypad 39. The alphanumeric keypad 39 allows a user to enter in the user's desired name for the singular list item 26. If the user is satisfied with the name, the user may select the Done button and the new name will be applied to the folder or list item. If the user wants to exit the Edit Screen 37, the user may select Cancel and be returned to the previous screen.

Once the name of a singular list item 26 has been edited, the edited name is used locally where it was changed. Alternatively, the edited name may be used globally for all references of that particularly edited singular list item. FIG. 6 shows an edited recording name 48 (i.e., MY FAVORITE BROTHER) originally named Brotherhood but edited using the Edit Name button 36 and the Edit Screen 37. This same edited recording name 48 appears in the folder 24 that the singular list item 26 is located, as shown in FIG. 7.

FIG. 8 depicts an example of multiple pointers to the same recording/downloaded content, each such pointer in a different folder 24. In FIGS. 2 and 3, the Brotherhood singular list items 26 are shown in the Brotherhood folder 24. In this embodiment, the Brotherhood singular list items 26 also appear in the Series/Specials folder 24. When multiple pointers to the same content are used, the content is usually stored in only one location on the PVR in order to minimize storage space used. Multiple folders may contain pointers to the single instance of the stored content. In this embodiment, a user has associated the Brotherhood and CSI series with the Series/Specials folder 24. Users may adapt the folders 24 so that content is organized however the user desires. For example, the user may create a folder 24 for sports, a folder 24 for movies, and another folder 24 for series such as shown in FIG. 8.

Content Management Rules

Figure 9:
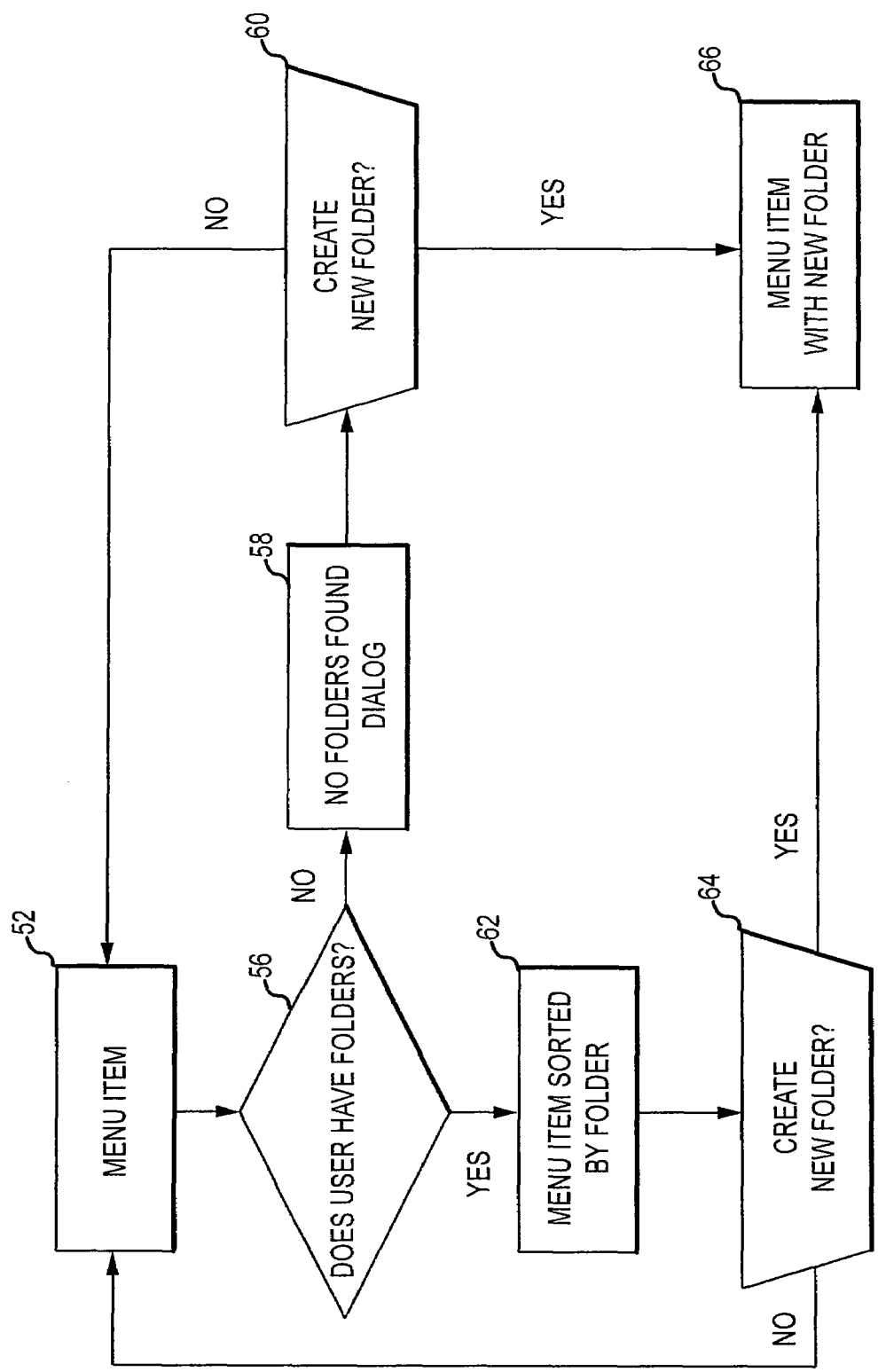
FIG. 9 is a flowchart of an exemplary method for creating a folder.
Figure 10A:
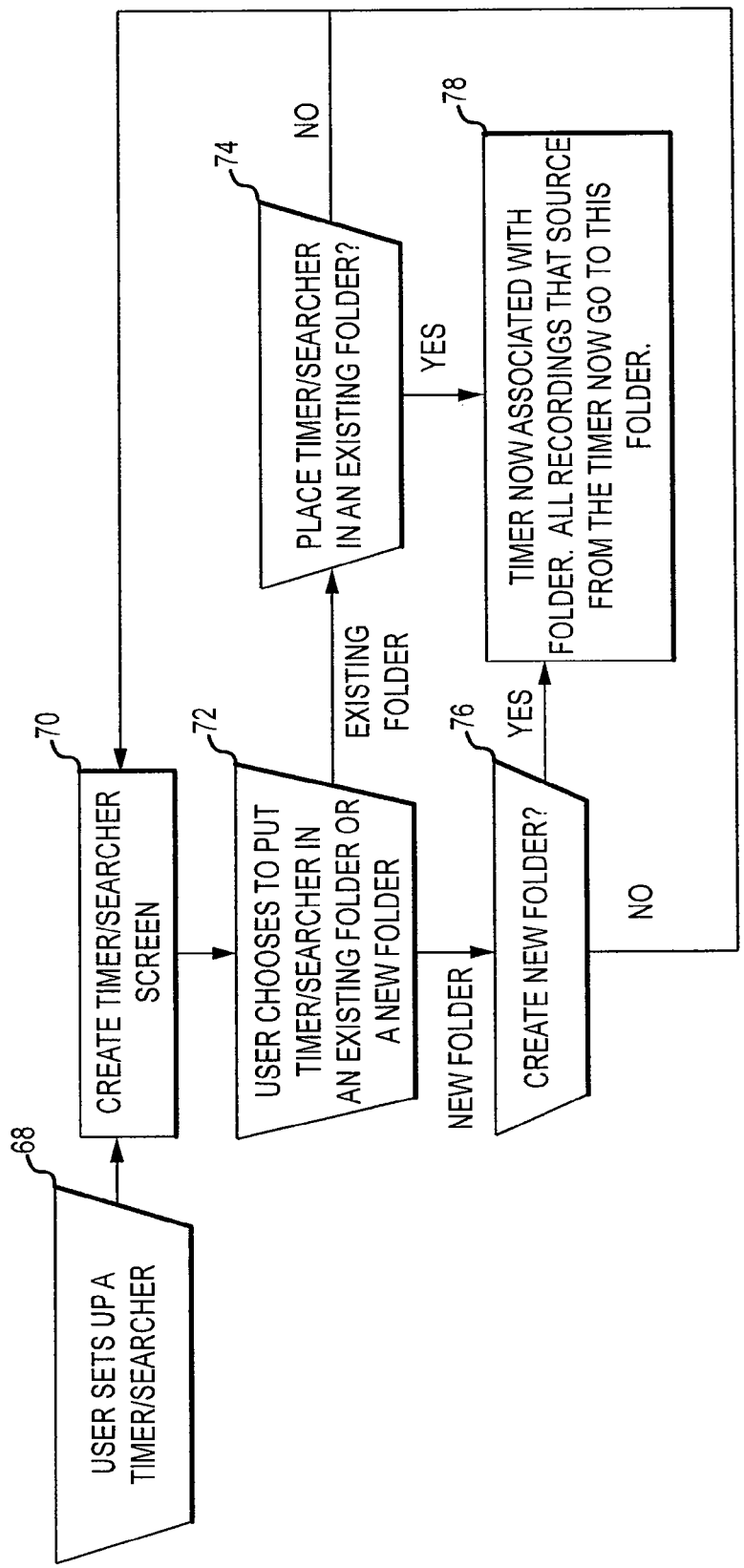
FIG. 10A is a flowchart of an exemplary method for associating a timer or searcher with a new or existing folder.
Figure 10B:
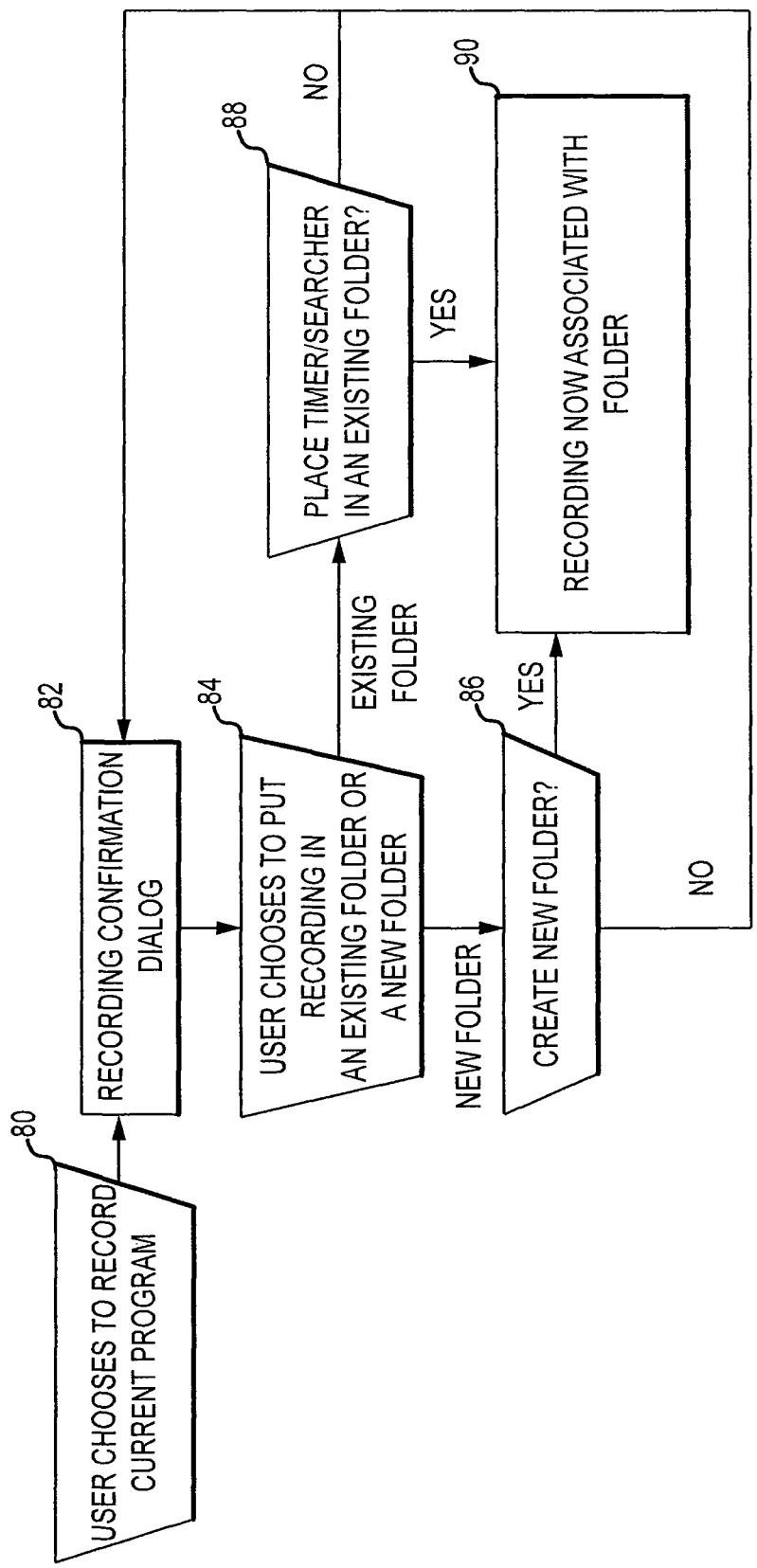
FIG. 10B is a flowchart of an exemplary method for associating a recording with a new or existing folder.
Figure 11:
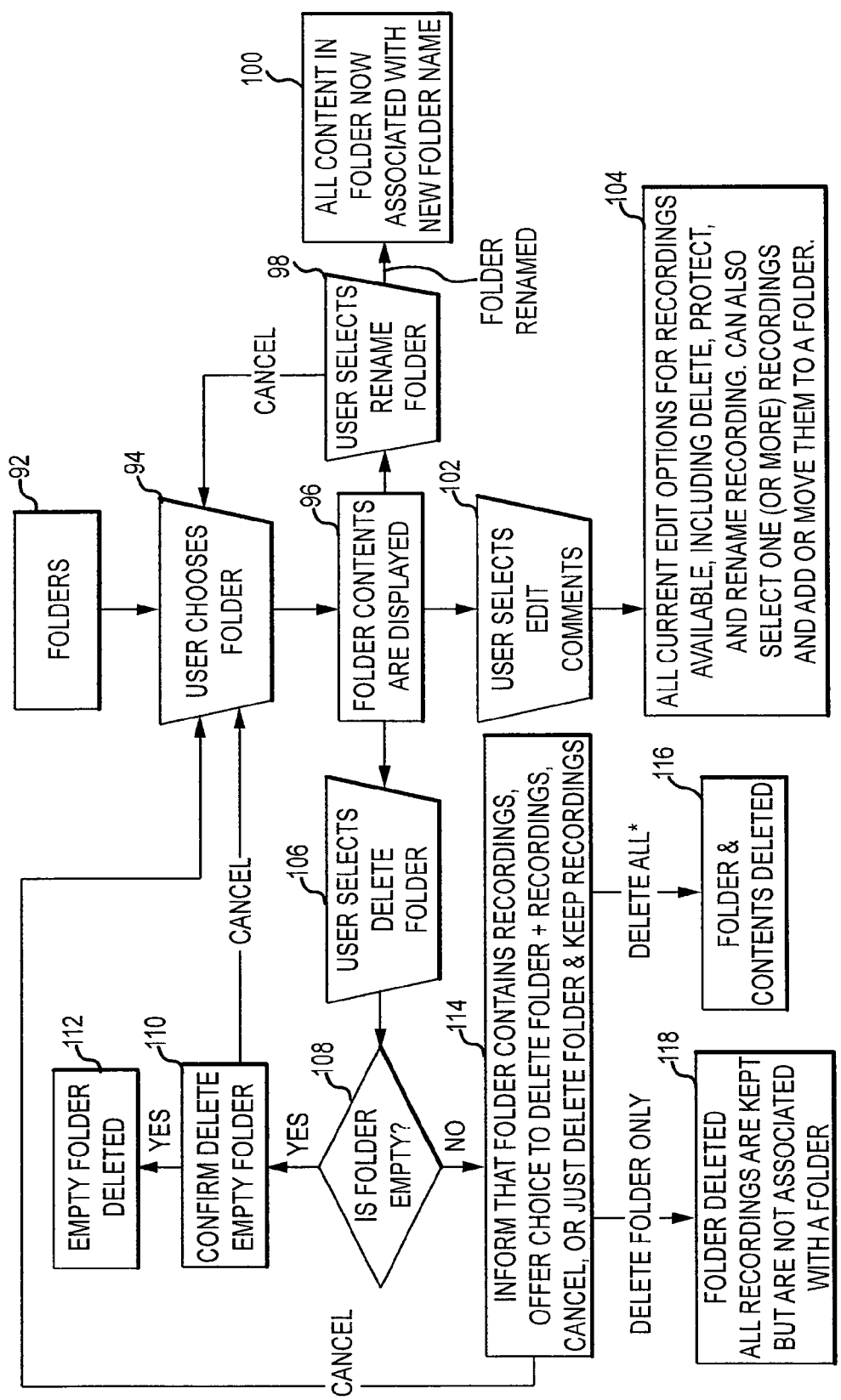
FIG. 11 is a flowchart of an exemplary method for editing, deleting and renaming folders.
Figure 12:
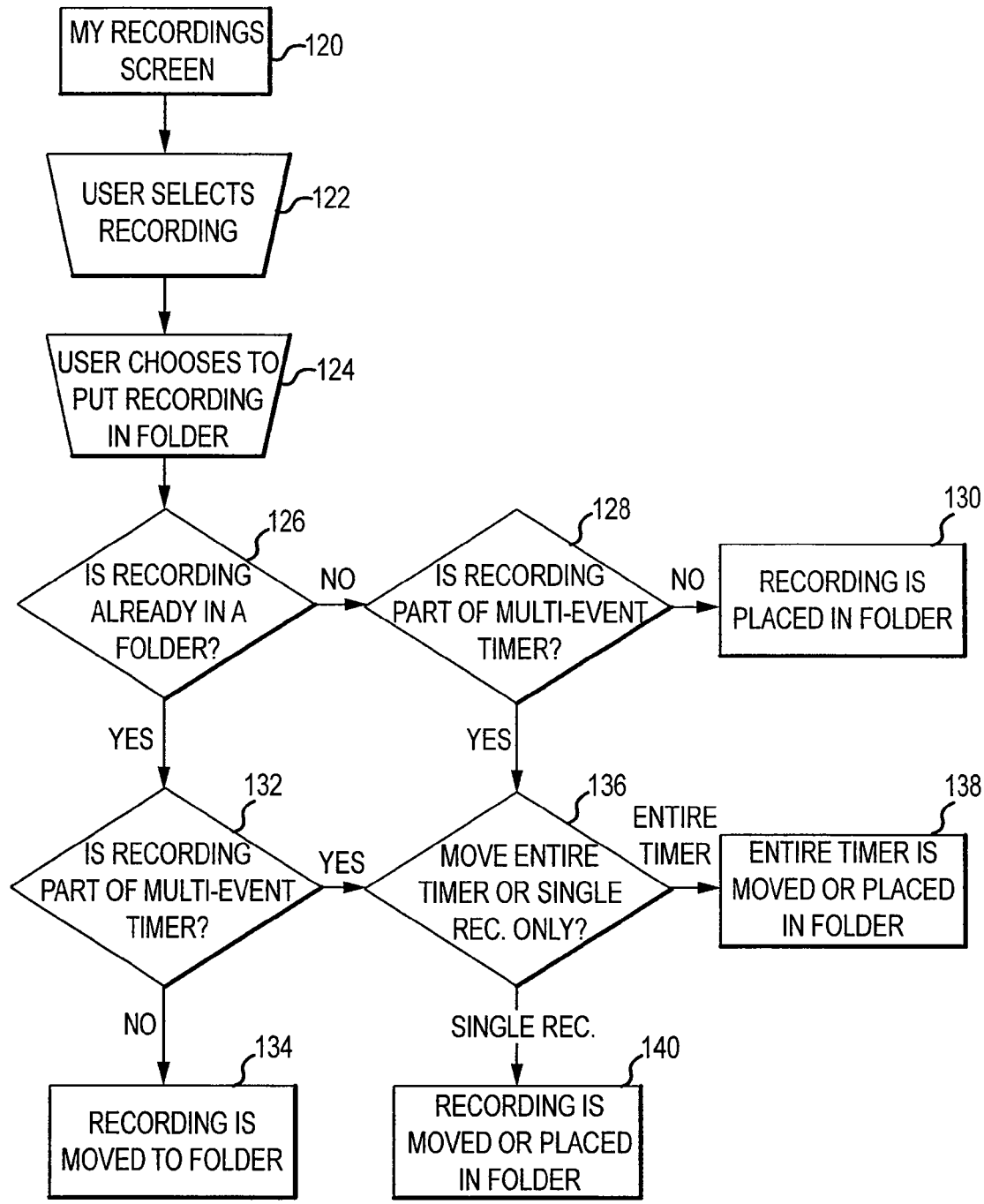
FIG. 12 is a flowchart of an exemplary method for associating a recording with an existing folder and moving recordings from one folder to another folder.
Figure 13:
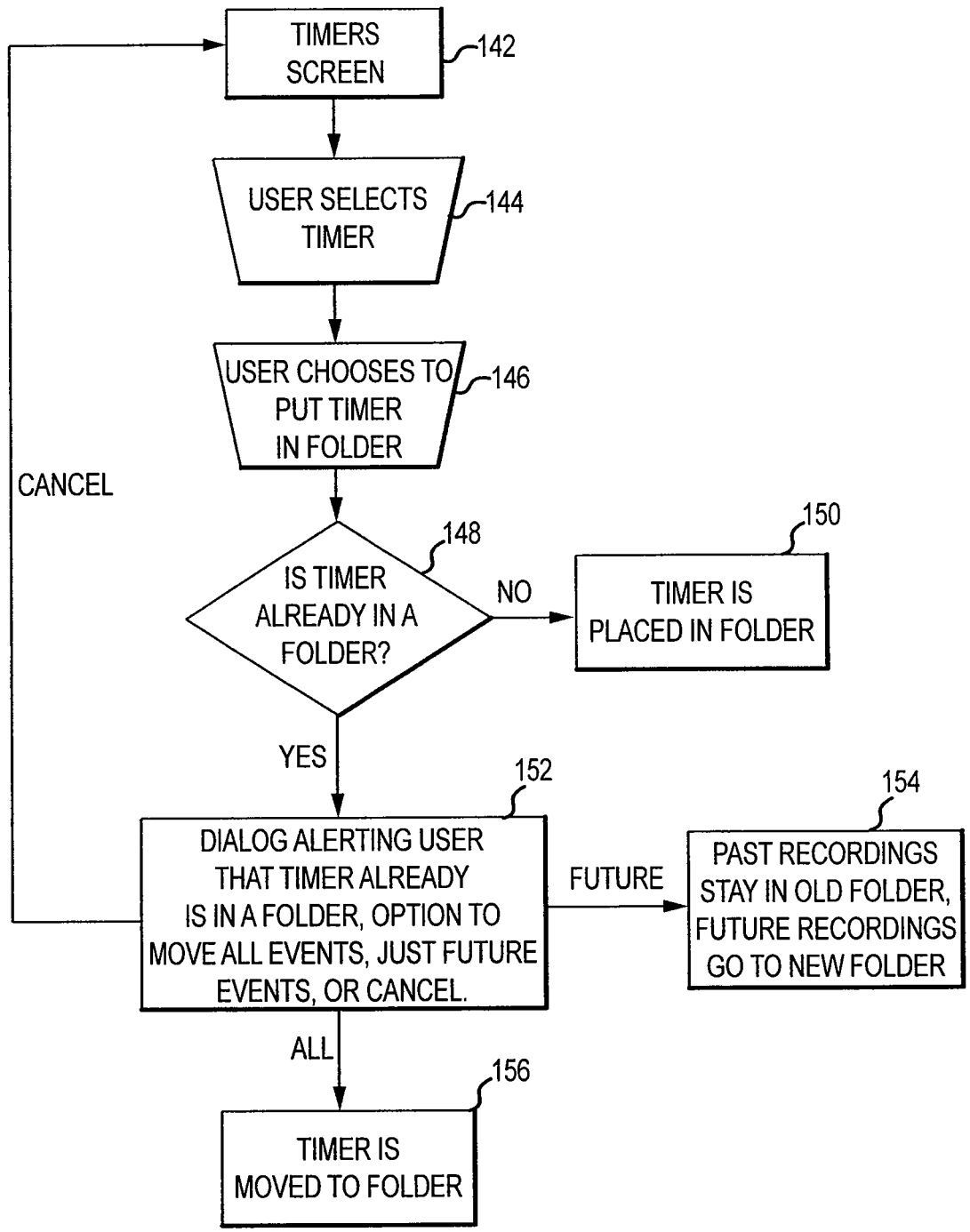
FIG. 13 is a flowchart of an exemplary method for associating a timer with an existing folder and moving timers from one folder to another folder.

For a discussion of content management rules utilized by the PVR of the present invention, reference is now made to FIGS. 9-13. FIG. 9 is a flowchart of an exemplary method for creating a folder. FIG. 10A is a flowchart of an exemplary method for associating a timer or searcher with a new or existing folder. FIG. 10B is a flowchart of an exemplary method for associating a recording with a new or existing folder. FIG. 11 is a flowchart of an exemplary method for editing, deleting and renaming folders. FIG. 12 is a flowchart of an exemplary method for associating a recording with an existing folder and moving recordings from one folder to another folder. FIG. 13 is a flowchart of an exemplary method for associating a timer with an existing folder and moving timers from one folder to another folder. For the purposes of these figures, the term "recordings," as used herein, also includes downloaded content.

Referring to FIG. 9, the method starts in operation 52 when a user initially accesses a menu item from the EPG 12 of the PVR. In one embodiment, the menu item is the My Recordings menu item 11 described above and containing recording content. In another embodiment, the menu item contains downloaded content or a combination of both downloaded and recorded content. In operation 56, the system checks to see if the user has any folders.

If the user has folders (for example, folders 24 as shown in FIG. 2), in operation 62, the embodiment displays the list of folders contained in the menu item. In one embodiment, the list of folders is sorted by one of the sorting methods described above. In operation 64, the embodiment determines if a user wants to create a new folder. If the embodiment's determination is positive (for example, because the user selects a menu option or otherwise signals that a new folder should be created), in operation 66 the embodiment creates the new folder in the menu item. If the user decides not to create a new folder, the user is returned to operation 52.

If the present menu item does not include a folder hierarchically beneath or related to the menu item, in operation 58, a dialog box may be generated to tell the user that no such folders exist. In operation 60, the embodiment determines if the user wants to create a new folder. If so, in operation 66 the embodiment creates a new folder in the menu item. If the embodiment determines in operation 64 that the user does not wish to create a new folder, the embodiment returns to operation 52.

FIG. 10A describes a method for associating a timer or searcher with a new or existing folder. The method starts in operation 68 when the embodiment receives an indication that a user wishes to set up a timer or a searcher. In operation 70, the embodiment presents to the user a screen or dialog through which a timer or searcher may be created. In operation 72, the embodiment may place the timer/searcher in an existing folder or a new folder. The placement of the timer/searcher may be determined, for example, by a user input. If the embodiment is to create a new folder, in operation 76 the embodiment displays a create new folder dialog box which the user may employ to create a new folder. Alternatively, if no folder is to be created, the embodiment may return to operation 70.

If the user selected create a new folder, in operation 78, a new folder is created and content associated with the timer/searcher is placed in the newly created folder. That is, the timer/searcher is associated with the newly created folder and all recordings that source from the timer/searcher may now automatically be placed into this folder (or a pointer to such content may be placed into the folder).

If the embodiment associates the timer/searcher with an existing folder, in operation 74, a list of existing folders may be displayed so that the timer/searcher may be associated with one or more existing folders. If the timer/searcher is not associated with one of the existing folders, the embodiment returns to operation 70. However, if the timer/searcher is associated with one of the existing folders, the embodiment proceeds to operation 78. In operation 78, the timer/searcher is associated with the existing folder. All recordings or downloads stored on the PVR as a result of the timer/searcher's execution may be automatically stored in, or associated with, the one or more existing folders selected. It should be noted that the association of a timer/searcher or content with one or more folders may be indicated through, for example, a user input.

FIG. 10B describes a method for associating a recording with a new or existing folder. The method starts in operation 80 when the embodiment receives an indication that a user initially wishes to record a program. In operation 82, the embodiment presents to the user a recording confirmation dialog box which tells the user that the program is being recorded. In operation 84, the embodiment may place the recording in an existing folder or a new folder. Alternatively, the embodiment may not put the recording in a folder, and the recording may be listed as a singular list item 26 as shown in FIG. 2. The placement of the recording may be determined, for example, by a user input.

In another embodiment, if the recording is part of a series, or matches (either exactly or closely) previously recorded material, the system may automatically create a folder for the recording, or, alternatively, place the recording in an existing folder. For example, if the recording is a Seinfeld episode, and there already exists a Seinfeld folder or Seinfeld singular list item, the system may either place the newly recorded Seinfeld episode in the existing Seinfeld folder or create a new folder and place the currently existing Seinfeld singular list item with the newly recorded Seinfeld episode.

If the embodiment is to create a new folder, in operation 86, the embodiment may display a create new folder dialog box which the user may employ to create a new folder. Alternatively, if no folder is to be created, the embodiment may return to operation 82. If the user selected create a new folder, in operation 90, a new folder is created and content associated with the recording is placed in the newly created folder. That is, the recording is associated with the newly created folder and all recordings that source from the recording may now automatically be placed into this folder (or a pointer to such content may be placed into the folder).

If the user opts to associate the recording with an existing folder, in operation 88 the embodiment displays a list of existing folders. The embodiment may either place the recording in an existing folder or may return to operation 70. The choice of which existing folder to place the recording in may be determined, for example, by a user input. If the embodiment is to place the content associated with the recording in one of the existing folders, the embodiment proceeds to operation 90. In operation 90, the recording is associated with the existing folder.

Referring to FIG. 11, which describes a method for editing, deleting and renaming folders. The method starts in operation 92 when the embodiment displays one or more folders located in a menu item that was selected, such as My Recordings 11 shown in FIG. 2. In operation 94, a user chooses one of the folders displayed by the embodiment to the user. In operation 96, the embodiment displays the contents of the selected folder. The embodiment, may delete the folder, rename the folder, or edit the contents of the folder. If the rename folder option is selected, the method may proceed to operation 98. In operation 98, the embodiment may either rename the folder or return to operation 94. In operation 100, the rename the folder option has been selected, and the embodiment presents to the user a display for the user to enter in the name that the user wants associated with the folder. All the content in the folder is now associated with the new folder name.

If the edit option is selected, the method may proceed to operation 102. In operation 102, the embodiment may either edit the folder or return to operation 94 (return line not shown). In operation 104, the edit option has been selected, and the embodiment presents to the user the options of deleting, protecting and renaming the recording. Furthermore, the embodiments displays the options of selecting one or more recordings and adding or moving the recordings to a folder.

If the delete option is selected, the method may proceed to operation 106. In operation 106, the embodiment may either delete the folder or return to operation 94 (return line not shown). In operation 108, the system checks to see if the folder selected for deletion is empty or contains content. If the folder is empty, the method may proceed to operation 110 where the embodiment may confirm the deletion or return to operation 94. If the embodiment confirms that the deletion is desired, the method may proceed to operation 112 and the empty folder is deleted.

If the folder is not empty, the method may proceed to operation 114. In operation 114, the system informs the user that the folder contains recordings and offers the user the choice to delete the folder along with the contained recordings, cancel or just delete the folder and keep the recordings. If the delete the folder and keep the recordings option is selected, the method may proceed to operation 118. In operation 118, the embodiment deletes the folder and all the recordings are kept but are not associated with the folder. If the delete both the folder and the contained recordings option is selected, the method may proceed to operation 116. In operation 116, the folder and the contents of the folder are deleted.

FIG. 12 shows a method for associating a recording with an existing folder and moving recordings from one folder to another. The method starts in operation 120 when the embodiment displays recordings located in a menu item that was selected by the user, such as My Recordings 11 shown in FIG. 2. In operation 122, one or more recordings displayed by the embodiment are selected. In operation 124, the content associated with the selected one or more recordings is placed in a folder. In operation 126, the system determines if the selected recording is already in a folder. If the selected recording is not already in a folder, the method may proceed to operation 128. In operation 128, the system determines if the recording is part of a multi-event timer. A multi-event timer is the same as a recurring timer described above. If the recording is not part of a multi-event timer, the method may proceed to operation 130. In operation 130, the embodiment places the recording in the selected folder.

If the recording is part of a multi-event timer, the method may proceed to operation 136. In operation 136, the embodiment presents the user the options of moving the entire timer, or just the single recording only. If the move the entire timer option is selected, the method may proceed to operation 138. In operation 138, the entire timer is moved or placed in the folder. If the move the single recording only option is selected, the method may proceed to operation 140. In operation 140, the recording is moved or placed in the folder.

Referring back to operation 126, if the recording is already in a folder, the method may proceed to operation 132. In operation 132, the system determines if the recording is part of a multi-event timer. If the recording is not part of a multi-event timer, the method may proceed to operation 134. In operation 134, the embodiment moves the recording to the selected folder.

If the recording is part of a multi-event timer, the method may proceed to operation 136. In operation 136, the embodiment presents the user the options of moving the entire timer, or just the single recording only. If the move the entire timer option is selected, the method may proceed to operation 138. In operation 138, the entire timer is moved or placed (moved if recording is already in a folder, placed if the recording is not already in a folder) in the folder. If the move the single recording only option is selected, the method may proceed to operation 140. In operation 140, the recording is moved or placed (moved if recording is already in a folder, placed if the recording is not already in a folder) in the folder.

FIG. 13 describes a method for associating a timer with an existing folder and moving timers from one folder to another. The method starts in operation 142 when the embodiment displays a timer screen (accessible by selecting the Schedule button 18 of FIG. 2) that shows a listing of timers. In operation 144, one or more timers displayed by the embodiment are selected. In operation 146, the content associated with the selected one or more timers is placed in a folder. The timer may be associated with both a present and future content The folder selected by the user to place the timer content in will contain all the content for that timer. In operation 148, the system checks to see if the timer is associated with a present folder. If the timer is not associated with a present folder, the method may proceed to operation 150. In operation 150, the timer is associated with the selected folder.

If the timer is associated with a present folder, the method may proceed to operation 152. In operation 152, a dialog box may be presented to the user alerting the user that the timer is already associated with a present folder. The embodiment may provide the options of moving all events (present and future content) or just future events (content) to the newly selected folder. The embodiment may also return to a previous screen such as operation 142. If the move future events option is selected, the method may proceed to operation 154. In operation 154, past recordings stay in the old (present) folder, and future recordings go into the new (selected) folder. If the move all events option is selected, the method may proceed to operation 156. In operation 156, the previously recorded contents of the timer are moved to the new folder and all future recordings will be associated with the new folder. In one embodiment, the same timer may be in multiple folders and all or some of the multiple folders receive the future recordings.

Conclusion

As will be recognized by those skilled in the art from the foregoing description of example embodiments of the invention, numerous variations on the described embodiments may be made without departing from the spirit and scope of the invention. Further, while the present invention has been described in the context of specific embodiments and processes, such descriptions are by way of example and not limitation. Accordingly, the proper scope of the present invention is specified by the following claims and not by the preceding examples.

The invention claimed is:

1. A method for managing content, comprising:

accessing a first digital program or movie by a set-top box;

automatically generating, by the set-top box, a first folder on a first storage location in accordance with at least one user defined content management rule in response to accessing the remote digital program or movie;

automatically placing, by the set-top box, the first digital program or movie in the generated first folder in accordance with the at least one user defined content management rule;

associating a timer with the first folder, thereby creating a timer association, wherein the timer causes the recording of an additional digital program or movie at a particular time on a particular channel;

recording the additional digital program or movie by the set-top box in accordance with the the timer;

determining, by the set-top box, if the additional program or movie matches a previously accessed digital video program or movie, wherein a match is determined by at least part of a title or metadata of the previously accessed digital video program or movie corresponding to a title or metadata of the additional digital program or movie;

if the additional program or movie matches the previously accessed digital program or movie, determining, by the set-top box, if the previously accessed program or movie is in a second folder;

if the previously accessed program or movie is in the second folder, placing, by the set-top box, the additional program or movie in the second folder with the previously accessed digital program or movie in addition to placing the additional program or movie in the first folder in accordance with the at least one user defined content management rule, and subsequently changing the association of the timer from the first folder to the second folder such that only future, but not past, recordings in accordance with the timer are placed only in the second folder; and if the previously accessed program or movie is not in the second folder, generating, by the set-top box, a third folder on the first storage location for the additional program or movie in accordance with the at least one user defined content management rule and placing, by the set-top box, the additional program or movie and the previously accessed program or movie in the generated third folder in addition to placing the additional program or movie in the first folder, and subsequently changing the association of the timer from the first folder to the third folder such that only future, but not past, recordings in accordance with the timer are placed only in the third folder;

if the additional program or movie does not match the previously accessed digital program or movie only placing the additional program or movie in the first folder.

2. The method of claim 1, wherein the at least one user defined content management rule places the first digital program or movie in the first folder at least partially based on an attribute of the first digital program or movie.

3. The method of claim 1, further comprising:
associating a timer with the first digital program or movie, thereby creating a timer association; wherein
the timer association comprises the attribute of the first digital program or movie.

4. The method of claim 1, wherein the at least one user defined content management rule places the first digital program or movie in the first folder at least partially based on an attribute of the first location.

5. The method of claim 1, wherein the at least one user defined content management rule is operative to be modified by a user.

6. The method of claim 1, further comprising:
providing the user the ability to create a new folder.

7. The method of claim 1, further comprising:
providing the user the ability to sort the recorded digital programs and/or movies.

8. The method of claim 7, further comprising sorting the digital programs and/or movies by at least one of actor, genre, theme, series and director.

9. The method of claim 1, wherein the step of accessing the first digital program or movie comprises downloading the first digital program or movie from a remote location.

10. The method of claim 1, wherein a match is determined using a word in the title of the previously accessed program or movie.

11. The method of claim 1, wherein:
the operation of accessing a remote digital program or movie comprises recording the remote digital program or movie; and
the operation of accessing an additional program or movie comprising recording the additional program or movie.

12. The method of claim 1, wherein the folder is deleteable.

13. The method of claim 1, wherein the folder has a timer associated with it, whereby all the recordings that source from the timer go into the folder.

14. The method of claim 1, wherein the digital program or movie is moveable from one folder to another folder.

15. The method of claim 1, further comprising:
providing a user the ability to sort the recorded digital programs and/or movies.

16. The method of claim 1, further comprising:
determining, by the set-top box, if the additional digital program or movie is part of a multi-event timer, the multi-event timer configure to cause the set-top box to record the program or movie at particular times.

17. The method of claim 16, wherein:
if the additional digital program or movie is part of a multi-event timer, determining, by the set-top box, if the multi-event time is associated with a folder.

18. The method of claim 17, wherein:
if the multi-event timer is associated with a folder, placing, by the set-top box, the additional program or movie in the folder associated with the multi-event timer in accordance with the at least one user defined content management rule.

* * * * *